(12) United States Patent
Eyer

(10) Patent No.: US 8,941,779 B2
(45) Date of Patent: Jan. 27, 2015

(54) NON-CLOSED CAPTION DATA TRANSPORT IN STANDARD CAPTION SERVICE

(71) Applicant: Sony Corporation, Tokyo (JP)

(72) Inventor: Mark Eyer, Woodinville, WA (US)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 13/800,818

(22) Filed: Mar. 13, 2013

(65) Prior Publication Data
US 2013/0250173 A1 Sep. 26, 2013

Related U.S. Application Data

(60) Provisional application No. 61/613,869, filed on Mar. 21, 2012.

(51) Int. Cl.
*H04N 7/00* (2011.01)
*H04N 7/088* (2006.01)
*H04N 21/236* (2011.01)
*H04N 21/2362* (2011.01)
*H04N 21/434* (2011.01)
*H04N 21/488* (2011.01)
*H04N 21/6543* (2011.01)
*H04N 21/81* (2011.01)
*H04N 21/8545* (2011.01)
*H04N 21/858* (2011.01)

(52) U.S. Cl.
CPC ......... *H04N 7/088* (2013.01); *H04N 21/23617* (2013.01); *H04N 21/2362* (2013.01); *H04N 21/4345* (2013.01); *H04N 21/4349* (2013.01); *H04N 21/4884* (2013.01); *H04N 21/6543* (2013.01); *H04N 21/8133* (2013.01); *H04N 21/8173* (2013.01); *H04N 21/8545* (2013.01); *H04N 21/8586* (2013.01)
USPC ............ 348/468; 725/135; 725/136; 725/137

(58) Field of Classification Search
USPC ............... 348/461, 465, 467, 468; 725/20
See application file for complete search history.

(56) References Cited

U.S. PATENT DOCUMENTS

| 5,543,852 A | * | 8/1996 | Yuen et al. | 348/478 |
| 5,617,146 A | * | 4/1997 | Duffield et al. | 348/460 |
| 6,507,369 B1 | * | 1/2003 | Kim | 348/465 |

(Continued)

OTHER PUBLICATIONS

International Search Report and Written Opinion issued May 17, 2013 in PCT/US2013/030646 filed Mar. 13, 2013.

(Continued)

*Primary Examiner* — Jefferey Harold
*Assistant Examiner* — Humam Satti
(74) *Attorney, Agent, or Firm* — Oblon, Spivak, McClelland, Maier & Neustadt, L.L.P.

(57) ABSTRACT

Methods, apparatuses, and non-transitory computer-readable storage mediums for providing and/or processing non-closed caption data. The reception apparatus includes a receiver, a parser, and a processor. The receiver receives closed caption service data. The closed caption service data includes closed caption data within a first service block having a service number in the range of 1-6, and non-closed caption data within a second service block having a different service number in the range of 1-6. The closed caption data includes closed caption text. The parser parses the non-closed caption data within the second service block having the different service number in the range of 1-6. The processor performs a function based on the parsed non-closed caption data.

20 Claims, 14 Drawing Sheets

(56) References Cited

U.S. PATENT DOCUMENTS

| | | |
|---|---|---|
| 2002/0162120 A1 | 10/2002 | Mitchell |
| 2005/0005303 A1 | 1/2005 | Barone, Jr. et al. |
| 2005/0262539 A1 | 11/2005 | Barton et al. |
| 2007/0022437 A1 | 1/2007 | Gerken |
| 2007/0124796 A1 | 5/2007 | Wittkotter |
| 2009/0034556 A1 | 2/2009 | Song et al. |
| 2009/0244373 A1* | 10/2009 | Park .............................. 348/468 |
| 2009/0296624 A1* | 12/2009 | Ryu et al. ...................... 370/312 |
| 2010/0157025 A1* | 6/2010 | Suh et al. ......................... 348/51 |
| 2010/0162307 A1 | 6/2010 | Suh et al. |
| 2011/0075990 A1 | 3/2011 | Eyer |
| 2011/0088075 A1 | 4/2011 | Eyer |
| 2011/0128443 A1* | 6/2011 | Blanchard et al. ............ 348/468 |
| 2011/0221863 A1 | 9/2011 | Eyer |
| 2011/0243536 A1 | 10/2011 | Eyer |
| 2011/0246488 A1 | 10/2011 | Eyer |
| 2011/0247028 A1 | 10/2011 | Eyer |
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |
| 2011/0307920 A1 | 12/2011 | Blanchard et al. |
| 2012/0044418 A1 | 2/2012 | Eyer |
| 2012/0047531 A1 | 2/2012 | Eyer |
| 2012/0050619 A1 | 3/2012 | Kitazato et al. |
| 2012/0050620 A1 | 3/2012 | Kitazato |
| 2012/0054214 A1 | 3/2012 | Yamagishi et al. |
| 2012/0054235 A1 | 3/2012 | Kitazato et al. |
| 2012/0054267 A1 | 3/2012 | Yamagishi et al. |
| 2012/0054268 A1 | 3/2012 | Yamagishi |
| 2012/0054783 A1 | 3/2012 | Yamagishi |
| 2012/0054784 A1 | 3/2012 | Kitazato et al. |
| 2012/0054816 A1 | 3/2012 | Dewa |
| 2012/0060197 A1 | 3/2012 | Kitahara et al. |
| 2012/0063508 A1 | 3/2012 | Hattori et al. |
| 2012/0072965 A1 | 3/2012 | Dewa |
| 2012/0081508 A1 | 4/2012 | Kitazato |
| 2012/0081607 A1 | 4/2012 | Kitazato |
| 2012/0082266 A1 | 4/2012 | Kitazato et al. |
| 2012/0082440 A1 | 4/2012 | Kitazato |
| 2012/0084802 A1 | 4/2012 | Kitazato |
| 2012/0084824 A1 | 4/2012 | Kitazato |
| 2012/0084829 A1 | 4/2012 | Kitazato |
| 2012/0185888 A1 | 7/2012 | Eyer et al. |
| 2012/0236113 A1 | 9/2012 | Eyer |
| 2012/0253826 A1 | 10/2012 | Kitazato et al. |
| 2012/0274848 A1 | 11/2012 | Kitahara et al. |
| 2012/0275764 A1 | 11/2012 | Eyer |
| 2013/0024894 A1 | 1/2013 | Eyer |
| 2013/0024897 A1 | 1/2013 | Eyer |
| 2013/0031569 A1 | 1/2013 | Kitazato et al. |
| 2013/0036440 A1 | 2/2013 | Eyer |
| 2013/0055313 A1 | 2/2013 | Eyer |
| 2013/0271653 A1* | 10/2013 | Kim et al. ..................... 348/473 |

OTHER PUBLICATIONS

International Search Report and Written Opinion issued Jun. 17, 2013 in PCT/US2013/036075 filed Apr. 11, 2013.
U.S. Appl. No. 13/559,188, filed Jul. 26, 2012, Kitazato.
U.S. Appl. No. 13/587,975, filed Aug. 17, 2012, Kitazato.
U.S. Appl. No. 13/593,554, filed Aug. 24, 2012, Kitazato et al.
U.S. Appl. No. 13/648,753, filed Oct. 10, 2012, Yamagishi.
U.S. Appl. No. 13/679,624, filed Nov. 16, 2012, Yamagishi.
U.S. Appl. No. 13/708,313, filed Dec. 7, 2012, Kitazato et al.
U.S. Appl. No. 13/741,863, filed Jan. 15, 2013, Kitazato et al.
U.S. Appl. No. 13/753,591, filed Jan. 30, 2013, Kitazato et al.
U.S. Appl. No. 13/777,429, filed Feb. 26, 2013, Kitazato et al.
U.S. Appl. No. 13/777,693, filed Feb. 26, 2013, Kitazato et al.
U.S. Appl. No. 13/777,734, filed Feb. 26, 2013, Kitazato et al.
U.S. Appl. No. 13/782,694, filed Mar. 1, 2013, Eyer.
U.S. Appl. No. 13/782,730, filed Mar. 1, 2013, Eyer.
International Search Report and Written Opinion of the International Searching Authority Issued May 31, 2013 in PCT/US13/33133.

* cited by examiner

| | b7 | b6 | b5 | b4 | b3 | b2 | b1 | b0 | |
|---|---|---|---|---|---|---|---|---|---|
| | 0 | 0 | 0 | 1 | 0 | 0 | 0 | 0 | EXT1 |
| | 1 | 0 | 0 | 1 | 1 | 0 | 0 | 0 | 0x98 |
| | T1 | T0 | 0 | L4 | L3 | L2 | L1 | L0 | type length |
| | ItvTrigger_data() | | | | | | | | |

Variable Length ItvTrigger Command

FIG. 8

Name: ItvTrigger — Interactive TV Trigger

Format: Variable-length

Command Coding:

| b7 | b6 | b5 | b4 | b3 | b2 | b1 | b0 | |
|---|---|---|---|---|---|---|---|---|
| 0 | 0 | 0 | 1 | 0 | 0 | 0 | 0 | EXT1 |
| 1 | 0 | 0 | 1 | 1 | 0 | 0 | 0 | 0x98 |
| 1 | 1 | 0 | L4 | L3 | L2 | L1 | L0 | |
| trigger() | | | | | | | | (variable length) |

Description: the ItvTrigger command provides for the transport of interactive TV trigger data. The ItvTrigger command is transported in standard caption Service #6.

Parameters:
* *Length (L)* is an unsigned integer that shall indicate the number of bytes following the header, in the range 11 to 27.

FIG. 9

| | No. of bits | Format | No. of Bytes |
|---|---|---|---|
| trigger() { | | | |
| reserved | 4 | bslbf | 1 |
| trigger_type | 4 | uimsbf | |
| for (i=0; k<L-1; k++) { | | | |
| trigger_character | 8 | uimsbf | 1 |
| } | | | |
| } | | | |

FIG. 10

| Establish Media Timing | |
|---|---|
| Format | <domain_name>"/"<program_id>"?mt="<media_time> |
| Example | xbc.us/223?mt=200909 |
| Purpose | Signal location of TPT; establish media timing |
| Usage Examples | • Response from ACR server<br>• broadcast periodically throughout program to allow receivers to synchronize and pre-load interactive content<br>• Live and non-live content |

FIG. 12A

| Live Event Trigger | |
|---|---|
| Format | <domain_name>"/"<program_id>"?id="<trigger_id> |
| Example | xbc.us/223?id=9 |
| Purpose | Cause the TPT event identified in trigger_id to be immediately executed |
| Usage Examples | Live events |

FIG. 12B

| Signal Upcoming Event Timing | |
|---|---|
| Format | <domain_name>"/"<program_id>"?id="<trigger_id>"?et="<event_time> |
| Example | xbc.us/223?id=8?et=310909 |
| Purpose | • Schedule execution of TPT event identified in trigger_id – e.g. when media_time equals event_time;<br>• Allows precise, synchronized timing<br>• Decouples timing uncertainty of delivery of trigger from execution time |
| Usage Examples | • Live events<br>• Can be broadcast periodically throughout program to update timing of events in TPT |

FIG. 12C

NON-CLOSED CAPTION DATA TRANSPORT IN STANDARD CAPTION SERVICE

CROSS REFERENCE TO RELATED DOCUMENTS

This application is related and claims priority to U.S. provisional patent application No. 61/613,869, filed Mar. 21, 2012, which is incorporated by reference in its entirety. This application is related to U.S. provisional patent application Nos. 61/452,247 filed Mar. 14, 2011, to Mark Eyer; 61/415,924 filed Nov. 22, 2010, entitled "Service Linkage to Caption Disparity Data Transport" to Mark Eyer, et al.; 61/415,457 filed Nov. 19, 2010, entitled "Disparity Data Signaling and Transport for 3D Captioning" to Mark Eyer, et al.; 61/346,652 filed May 20, 2010, entitled "Disparity Data Transport" to Mark Eyer, et al.; 61/313,612 filed Mar. 12, 2010, to Mark Eyer et al.; 61/316,733 filed Mar. 23, 2010, entitled "Extended Command Stream for CEA-708 Captions" to Mark Eyer et al., and 61/378,792 filed Aug. 31, 2010, entitled "Efficient Transport of Frame-by-Frame Change in Captioning Disparity Data" to Mark Eyer. This application is also related to U.S. non-provisional patent application Ser. Nos. 13/022,828, 13/022,817, and 13/022,810 which were each filed on Feb. 8, 2011. Each of the above applications is hereby incorporated by reference in their entirety.

BACKGROUND OF THE INVENTION

1. Field of the Invention

Embodiments described herein relate generally to a reception apparatus, information providing apparatus, methods, non-transitory computer-readable storage mediums for providing and/or processing non-closed caption data provided in a closed caption service. More particularly, embodiments of the present application relate generally to non-closed caption data transported in a standard caption service.

2. Background

Embodiments of the present disclosure arise out of the need to find a reliable transport method for adjunct data such as interactive television (iTV) triggers from a content creator, through the distribution chain, and finally to an iTV receiver. A number of "roadblocks" are well known, including the presence of the HDMI interface between a cable or satellite set-top box (STB) and the iTV receiver.

SUMMARY OF THE INVENTION

According to an embodiment of the present disclosure, there is provided a reception apparatus. The reception apparatus includes a receiver, a parser, and a processor. The receiver receives closed caption service data. The closed caption service data includes closed caption data within a first service block having a service number in the range of 1-6, and non-closed caption data within a second service block having a different service number in the range of 1-6. The closed caption data includes closed caption text. The parser parses the non-closed caption data within the second service block having the different service number in the range of 1-6. The processor performs a function based on the parsed non-closed caption data.

According to an embodiment of the present disclosure, there is provided a method of a reception apparatus for processing non-closed caption data. The method includes receiving by the reception apparatus closed caption service data. The closed caption service data includes closed caption data within a first service block having a service number in the range of 1-6, and non-closed caption data within a second service block having a different service number in the range of 1-6. The closed caption data includes closed caption text. A parser of the reception apparatus parses the non-closed caption data within the second service block having the different service number in the range of 1-6. A processor of the reception apparatus performs a function based on the parsed non-closed caption data.

Further, in an embodiment of the present disclosure, there is provided a non-transitory computer-readable storage medium storing instructions which when executed by a computer causes the computer to perform the above-described method of the reception apparatus.

According to an embodiment of the present disclosure, there is provided an information providing apparatus. The information providing apparatus includes a closed caption unit configured to generate or receive closed caption service data associated with audio/video (A/V) content. Further, the information providing apparatus includes a communication interface configured to provide, to a reception apparatus, the A/V content and the closed caption service data. The closed caption service data includes closed caption data within a first service block having a service number in the range of 1-6, and non-closed caption data within a second service block having a different service number in the range of 1-6. The closed caption data includes closed caption text.

According to an embodiment of the present disclosure, there is provided a method of an information providing apparatus for providing non-closed caption data. The method includes generating or receiving, by the information providing apparatus, closed caption service data associated with A/V content. The information providing apparatus provides to a reception apparatus the A/V content and the closed caption service data. The closed caption service data includes closed caption data within a first service block having a service number in the range of 1-6, and non-closed caption data within a second service block having a different service number in the range of 1-6. The closed caption data includes closed caption text.

Further, in an embodiment of the present disclosure there is provided a non-transitory computer-readable storage medium storing instructions which when executed by a computer causes the computer to perform the above-described method of the information providing apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is an example of an ItvTrigger_data( ) command arrangement consistent with certain embodiments of the present disclosure.

FIG. 9 is another example of an ItvTrigger_data( ) command arrangement consistent with certain embodiments of the present disclosure.

FIG. 10 is exemplary syntax of an ItvTrigger_data( ) command arrangement consistent with certain embodiments of the present disclosure.

FIGS. 12A-12C illustrate exemplary trigger types.

DETAILED DESCRIPTION

Figure 1:
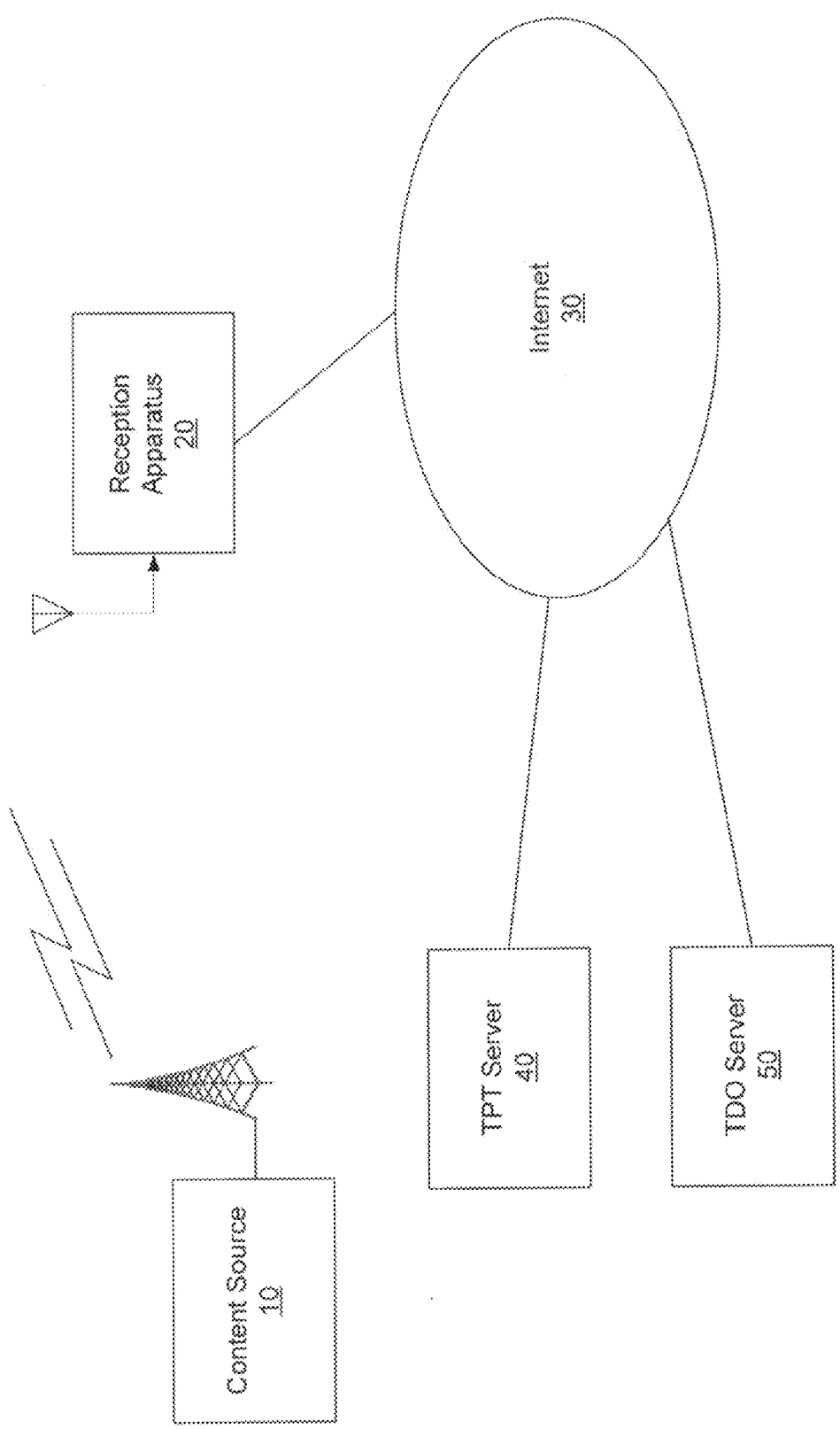
FIG. 1 illustrates an exemplary broadcast system including a content source, reception apparatus, trigger parameters table (TPT) server, triggered declarative object (TDO) server, and an automatic content recognition (ACR) system.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio/video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an implementation", "an example," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B, or C" means "any of the following: A; B; C; A and B; A and C; B and C; A, B, and C". An exception to this definition will occur only when a combination of elements, functions, steps or acts are in some way inherently mutually exclusive.

Referring now to the drawings, FIG. 1 is a block diagram that shows an exemplary broadcast system 2, including a content source 10, a reception apparatus 20, a trigger parameters table (TPT) server 40, and a triggered declarative object (TDO) server 50. The reception apparatus 20 accesses the TPT server 40 and TDO server 50 via one or more communication networks such as the Internet 30.

In one embodiment, the content source 10 provides content to the reception apparatus 20. The content includes for example one or more television programs, which are broadcast in digital television broadcast signals for example. The content source 10 also provides non-closed caption data that is associated with the content. In one embodiment, the content source 10 broadcasts the content and non-closed caption data in an MPEG-2 Transport Stream (TS).

Embodiments of the present disclosure utilize a caption data transport to deliver one or a combination of non-closed caption data for those cases in which closed caption data is available to the reception apparatus 20. Examples of non-closed caption data include trigger data (e.g., a short trigger), a data stream (e.g., including one or more parameters) suitable for ingestion and processing by one or more TDOs, any other data related to one or more digital television services or interactive-television applications, etc.

Figure 2:
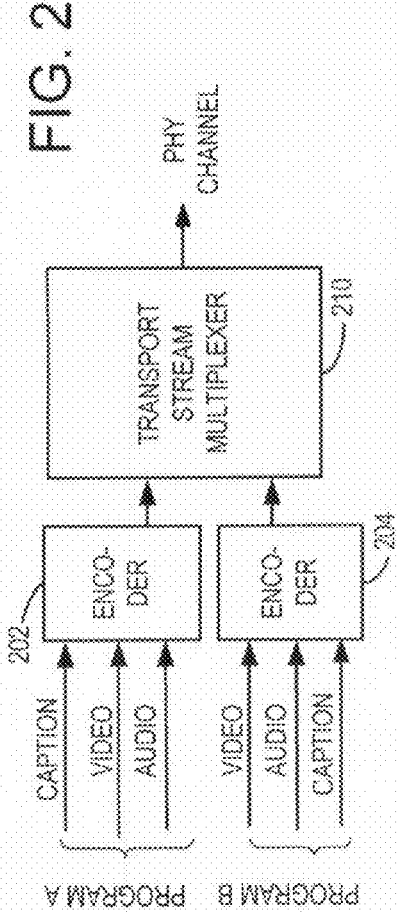
FIG. 2 is an example of a content source consistent with certain embodiments of the present disclosure.

A basic diagram of the content source 10 is depicted in FIG. 2. Examples of the content source 10 include a service provider or broadcaster. A single content source 10 may provide a plurality of content over one or more transport streams. The audio, video, and closed caption service data are provided to an encoder which encodes the data into packets suitable for distribution, including caption data packets. As illustrated in FIG. 2, Program A and Program B are encoded by encoders 202 and 204 which are then provided to a transport stream multiplexer 210. The transport stream multiplexer 210 provides an output that can be distributed via a physical channel medium such as a terrestrial, cable, or satellite broadcast. In another embodiment the audio, video, and closed caption service data (e.g., as part of a closed caption transport, caption data stream, closed caption data packets, etc.) is alternatively or additionally provided via a data communication network such as the Internet.

Figure 3:
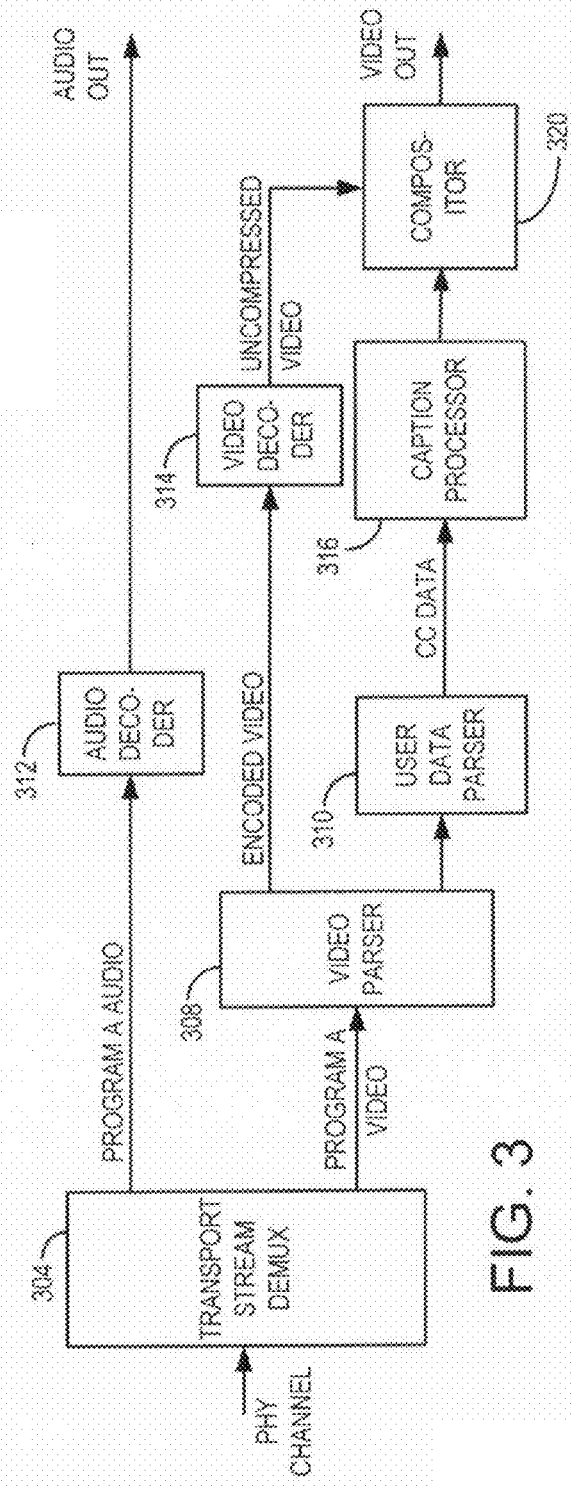
FIG. 3 is an example of a reception apparatus consistent with certain embodiments of the present disclosure.

A basic diagram of a reception apparatus 20 is depicted in FIG. 3. In one embodiment, the reception apparatus 20 is a television receiver device such as a television or set top box. The reception apparatus 20 receives the encoded data provided by the content source 10 from the physical channel. The transport stream is demultiplexed at a transport stream demultiplexer 304 to produce one or more program streams including audio, video, and closed caption service data (as well as possibly other data not shown). Video packets from Program A are passed from the demultiplexer 304 to a video parser 308. Audio packets from Program A are passed from the demultiplexer 304 to an audio decoder 312 which in turn produces the audio output. The video parser 308 extracts video packets from the video stream and passes them to a video decoder 314. The video parser 308 extracts user data from the video stream and passes it to a user data parser 310. The user data parser 310 extracts closed caption service data from within user data packets and passes it to a caption processor 316. Within the caption processor 316, caption service blocks containing data for caption services other than the one of interest are filtered out and discarded. The output of the caption processor 316 includes the graphical representation of the closed captions, typically text enclosed in caption windows.

In one embodiment, when the caption service blocks include an Adjunct Data service, the caption processor 316 processes the caption service blocks corresponding to the Main service of interest, while at the same time processing caption service blocks corresponding to the mapped Adjunct Data service. Further, in one embodiment, the caption processor 316 processes caption service blocks corresponding to the Adjunct Data service whenever non-closed caption data is available or continuously processes the caption service blocks to determine the availability of the non-closed caption data. The caption processor 316 outputs the non-closed caption data to an appropriate component such as the CPU 438, illustrated in FIG. 4.

The compositor 320 combines, for example, closed caption text from the caption processor 316 and video from the video decoder 314 for display.

Figure 4:
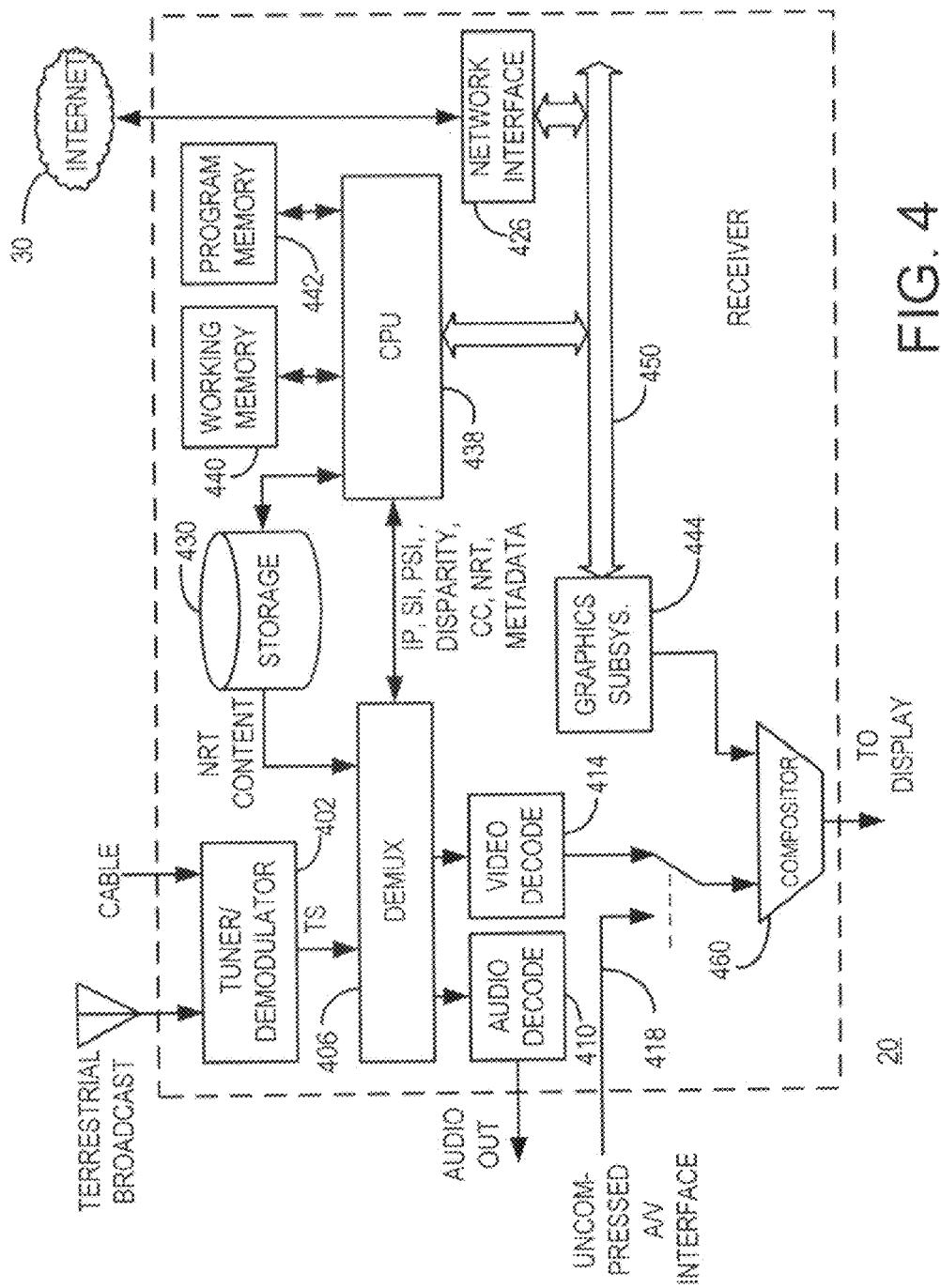
FIG. 4 is another example of a reception apparatus consistent with certain embodiments of the present disclosure.

FIG. 4 illustrates an embodiment of the reception apparatus 20 in further detail. The reception apparatus 20 receives content via any suitable source such as terrestrial broadcast, cable, or satellite at tuner/demodulator 402. In one embodiment, the content is received over a home network via, for example, a network interface 426. The content is received over the home network from, for example, a cable/satellite/IPTV set-top box that supports Digital Living Network Alliance (DLNA) protocols and offers a compressed video stream via a network interface. The transport stream from the tuner/demodulator 402 is demultiplexed at a demultiplexer 406 into audio and video streams. The audio is decoded at an audio decoder 410 while the video is decoded at a video decoder 414. Uncompressed A/V data may also be received via an uncompressed A/V interface 418 that can be selectively utilized.

A/V content may also be received via the Internet 30 via the network interface 426 for IP television content decoding. Additionally, a storage 430 can be provided for non-real time (NRT) stored content. The NRT content can be played by demultiplexing at the demultiplexer 406 in a manner similar to that of other sources of content. The reception apparatus 20 generally operates under control of a processor such as a CPU 438 which is interconnected to a working memory 440 and a program memory 442, as well as a graphics subsystem 444 via one or more buses such as a bus 450.

The CPU 438 receives closed caption service data, including closed caption data and non-closed caption data, from the demultiplexer 406 via the mechanism described herein. When the non-closed caption data includes, for example, a short trigger or one or more parameters for a TDO, the CPU 438, in one embodiment, performs a function based on, or in response to, the parsed non-closed caption data. When the non-closed caption data includes display information, the information is passed to the graphics subsystem 444 and the images are combined at the compositor 460 to produce an output suitable for processing and display on a video display.

In one embodiment, when the content is received via the network interface 426, the CPU 438 also receives the closed caption service data from the network interface 426.

Figure 5:
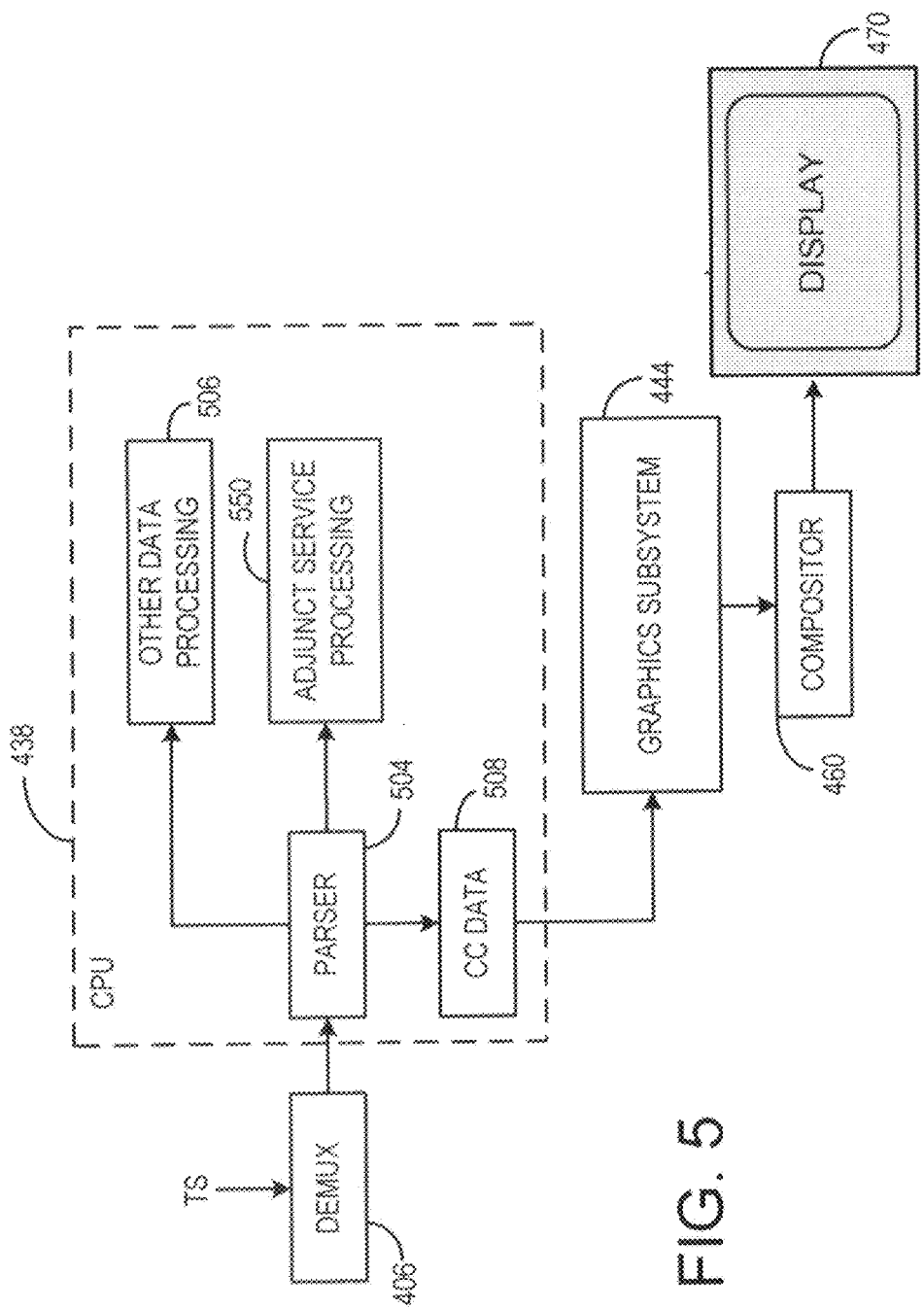
FIG. 5 is an exemplary implementation block diagram of a reception apparatus consistent with certain embodiments of the present disclosure.

FIG. 5 illustrates another example of the reception apparatus 20. A CPU 438 receives a demultiplexed digital television stream containing Standard service numbers within the range of 1-6 from a demultiplexer 406. The Standard service numbers are parsed at parser 504 and sent to the Adjunct service processing block 550. Closed caption data 508 is sent to the graphics subsystem 444. In one embodiment, when non-closed caption data is provided such as a short trigger or one or more parameters for a TDO, the CPU 438 performs a function based on, or in response to, the parsed non-closed caption data. Further, when the non-closed caption data includes display data, in one embodiment, the display data is passed to the graphics subsystem 444 for processing and compositor 460 for display on a display such as display 470 (e.g., for the display of a stereoscopic 3D closed caption text in a closed caption window). The parser 504 also parses other data for other data processing block 506.

Referring back to FIG. 1, the TPT server 40 (e.g., a broadcast business operator or the like broadcasting content via the content source 10) stores TPTs for access by the reception apparatus 20. In one embodiment, the reception apparatus 20 retrieves a TPT from the TPT server 40 based on information included in a standard caption service.

Figure 13:
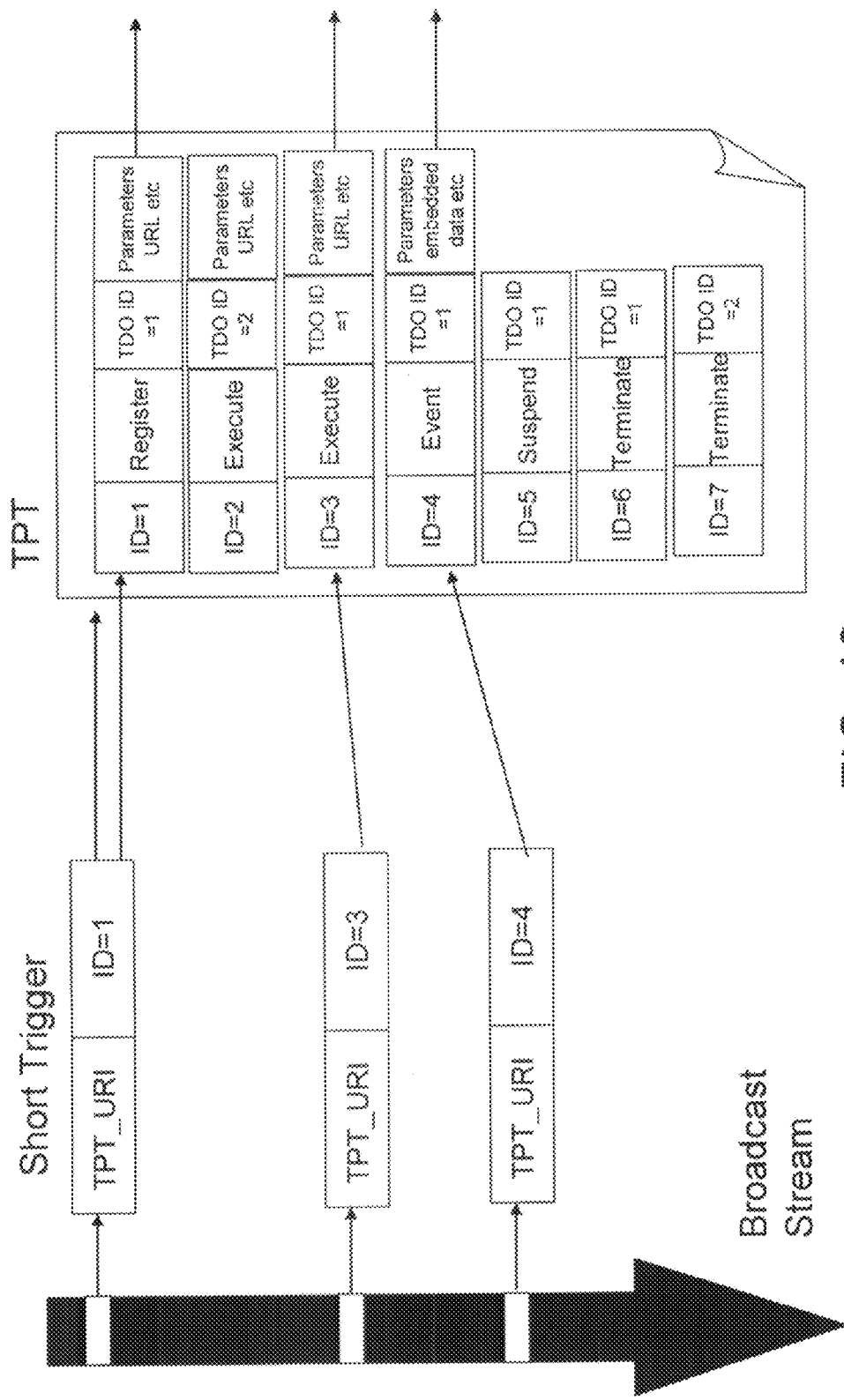
FIG. 13 illustrates an exemplary TPT with associated triggers.

The TPT, in one embodiment, includes a primary key (e.g., a tag element, trigger event id, etc.) that associates each element (row) in the table with an associated trigger event. A trigger, in turn, will refer to a particular event in the TPT by means of this key. FIG. 13 illustrates an example of the relationship between a trigger and a TPT. As illustrated in FIG. 13, the TPT in one embodiment contains metadata about one or more TDOs and the one or more events targeted to them. For example, a TPT contains TDOs of an associated program segment and the events targeted to them.

Further, in one embodiment, the TPT is a correspondence table that associates a command for controlling a TDO with a valid period and a valid time of that command. The valid period and valid time of the command are determined in keeping with the progress of content. For example, when the time acquired from a trigger from the content source 10 as indicative of the progress of content either falls within the valid period of the command or has run past a valid start time thereof on the basis of the TPT acquired from the TPT server 40, the reception apparatus 20 specifies the command as being valid. In one embodiment, the reception apparatus 20 controls the operation of the TDO. Also in keeping with the specified command, the reception apparatus 20 accesses the TDO server 50 via the Internet 30 to acquire the TDO.

The TDO server 50 stores TDOs for access by the reception apparatus 20. In one embodiment, the reception apparatus 20 retrieves a TDO from the TDO server 50 based on information included in a standard caption service, via for example a TPT.

A TDO is a downloadable software object created by a content provider, content creator, or service provider, which includes declarative content (e.g., text, graphics, descriptive markup, scripts, and/or audio) whose function is tied in some way to the content it accompanies. An embodiment of the TDO is described in U.S. application Ser. No. 12/959,529 filed Dec. 3, 2010 entitled "Announcement of Triggered Declarative Objects" to Blanchard, et al. which is hereby incorporated by reference in its entirety. However, the TDO is not limited to the structure described in Blanchard, et al. since many attributes defined therein as being a part of a TDO could be situated in a trigger or vice versa or not present at all depending upon the function and triggering of a particular TDO.

The TDO is generally considered as "declarative" content to distinguish it from "executable" content such as a Java applet or an application that runs on an operating system platform. Although the TDO is usually considered to be a declarative object, a TDO player supports a scripting language that is an object-oriented programming language. The TDOs are typically received from a content or service provider in advance of the time they are executed, so that the TDO is available when needed. Moreover, an explicit trigger signal may not be necessary and a TDO may be self-triggering or triggered by some action other than receipt of a trigger signal. Various standards bodies may define associated behaviors, appearances, trigger actions, and transport methods for content and metadata for a TDO. Additionally, requirements regarding timing accuracy of TDO behaviors relative to audio/video may be defined by standards bodies.

When the content source 10 broadcasts an MPEG-2 TS, the full broadcast multiplex may not be available to the reception apparatus 20. In some cases, due to reprocessing at a cable/satellite plant, some adjunct data may be stripped out. Examples include extra descriptors in the Program Map Table (PMT) and extra Elementary Stream (ES) components in the content.

When at least some portion of the content is delivered in compressed form, in one embodiment, MPEG or Advanced Video Coding (AVC) compressed video packets will be available. These packets contain the closed caption data stream. Some examples of cases where compressed video is available are when the reception apparatus 20 accesses the TS directly from an 8-VSB or Mobile DTV tuner, or when it has home network access to a cable/satellite/IPTV set-top box that supports DLNA protocols and offers a compressed video stream on the network interface.

The FCC has ruled that digital cable set top boxes in the United States must support network interfaces allowing devices on a network to access compressed audio/video for decoding and recording. Access to the compressed audio/video may be provided, for example, via DLNA protocols. This method affords a new path for delivery of compressed video including for example closed captioning. Thus, when the caption data stream does not make it across the current HDMI interface, in one embodiment, a partial TS can be accessed by means of DLNA methods and as required by FCC rules. In another embodiment, if the HDMI interface is modified to carry the caption data stream, the partial TS can be accessed from the HDMI interface instead of using the DLNA methods.

The CEA-708 advanced captioning standard supports multiple simultaneous caption services so that, for example, captioning in different languages can be offered for the same content, or program. CEA-708 defines a "minimum decoder" in Section 9. A minimum decoder is required to process the "Standard" service numbers 1 through 6. Processing "Extended" services 7 through 63 is optional. Quoting from CEA-708, "Decoders shall be capable of decoding all Caption Channel Block Headers consisting of Standard Service Headers, Extended Service Block Headers, and Null Block headers." CEA-708 is incorporated by reference in its entirety.

Some embodiments of the non-closed caption data transport methods described herein involve placing one or a combination of non-closed caption data in an Adjunct Data service. In this approach Standard Service Number 6 is recognized as the Adjunct Data service according to the preferred implementation.

In one embodiment, the broadcast system 2 illustrated in FIG. 1 is configured such that caption service 6 (or some other Standard service number in the 1-6 range) carries one or a combination of non-closed caption data. Within Standard Service #6, for example, signaling is present to associate a certain block of non-closed caption data with a particular one of the Standard services (1-6), when necessary. In real world situations it is rare for more than one or two of the Standard service numbers (usually services 1, 2 and perhaps rarely 3) to be used. Further, CEA-708 data can be present in a non-real-time file. Thus, interactivity can also be enabled for file-based content.

As described above, embodiments of the present disclosure place Adjunct Data in Standard service packets. All legacy decoders should be able to handle the presence of Standard service packets and are able to filter out packets corresponding to services they are not set to decode (non-selected services).

Some legacy receivers may not use the PSIP Caption Service Descriptor (CSD) to create the user interface for selection of caption services. In this case, it could be possible for the user to select caption Service #6 (the Adjunct Data channel) and attempt to decode it. The proposed method uses a "variable-length" command which would be unknown to the receiver. Receivers are expected to discard unsupported commands, thus they should be able to skip the proper number of bytes in order to discard the command. In this case, nothing would be displayed for Service #6.

Even in the case that something were to be displayed (garbage characters or whatever), the user would decide this is not a good caption service and would choose a better one. Hence, no harm would be done.

In current practice, it is rare that even two simultaneous caption services are used. Content captioned in both English and Spanish are somewhat rare, but do occur. Content captioned in more than two simultaneous languages are seldom if ever produced. Therefore, placing a variable-length command in Service #6 is not disruptive to current and most contemplated caption services delivery.

Further, it is believed that all existing receivers are able to properly skip service blocks corresponding to service numbers they are not currently decoding. Moreover, proper handling in the receiver of Standard caption services 1-6 is required by FCC rules. If any legacy receiver attempts to decode non-closed caption data (which should not normally occur, as caption services containing non-closed caption data are not announced in the Caption Service Descriptor), if the receiver is built according to CEA-708-D it will simply disregard the contents of the command. CEA-708-D is incorporated by reference in its entirety.

To optimize compatibility with legacy decoders (while not being able to absolutely guarantee that all legacy decoders would be able to properly disregard the new command), the Variable Length Command as defined in CEA-708-D Sec. 7.1.11.2 can be used. Such commands use the "C3" command ("C3 Code Set—Extended Control Code Set 2"). If properly implemented, legacy decoders should skip variable length commands further assuring that they will not take an unpredictable action.

Hence, in order to help assure that legacy decoders will not malfunction due to attempting to process non-closed caption data, Standard Service #6 (in the example preferred implementation) is used to transport the non-closed caption data. To further prevent legacy decoders from attempting to render the services, a variable-length command can be used to define the non-closed caption data in any suitable manner. While some legacy decoders may not properly implement the "skip variable length extensions" feature as defined in CEA-708, viewers may not be given an option to choose Standard Service #6 anyway since it is an "unannounced" service. Unless all six Standard Services actually carry caption services (a situation that is currently believed to be extremely rare if in existence at all), Service #6 will not be announced in the Caption Service Descriptor (CSD) defined in ATSC A/65 *Program and System Information Protocol* (PSIP), which is incorporated by reference in its entirety.

Although new metadata can also be added to the TS via other methods, those methods are more troublesome on the creation side and on the decoder side. The following are a number of exemplary methods.

Adaptation fields: Requires significant video encoder upgrades, and involves a new protocol between the metadata source and the encoder. Significant new standards work is required. Decoder must parse and extract adaptation fields from the TS to make them available to the decoder CPU.

Video user data: Again requires significant video encoder upgrades, and involves a new protocol between the metadata source and the encoder. Decoder must parse and extract video user data from the video stream to make it available to the decoder CPU.

Audio user data: Again requires significant audio encoder upgrades, and involves a new protocol between the metadata source and the encoder. Decoder must parse and extract video user data from the audio stream to make it available to the decoder CPU.

Elementary Streams: Requires significant video encoder upgrades, and involves a new protocol between the metadata source and the encoder.

Further, with respect to the brick wall problem, if the whole TS gets to the reception apparatus 20 (e.g., an ATSC 2.0 receiver), all these methods are about equal. If only a partial TS gets to the reception apparatus 20, what will survive? Everything except for separate Elementary Streams, which may not be included in the TS.

Figure 6:
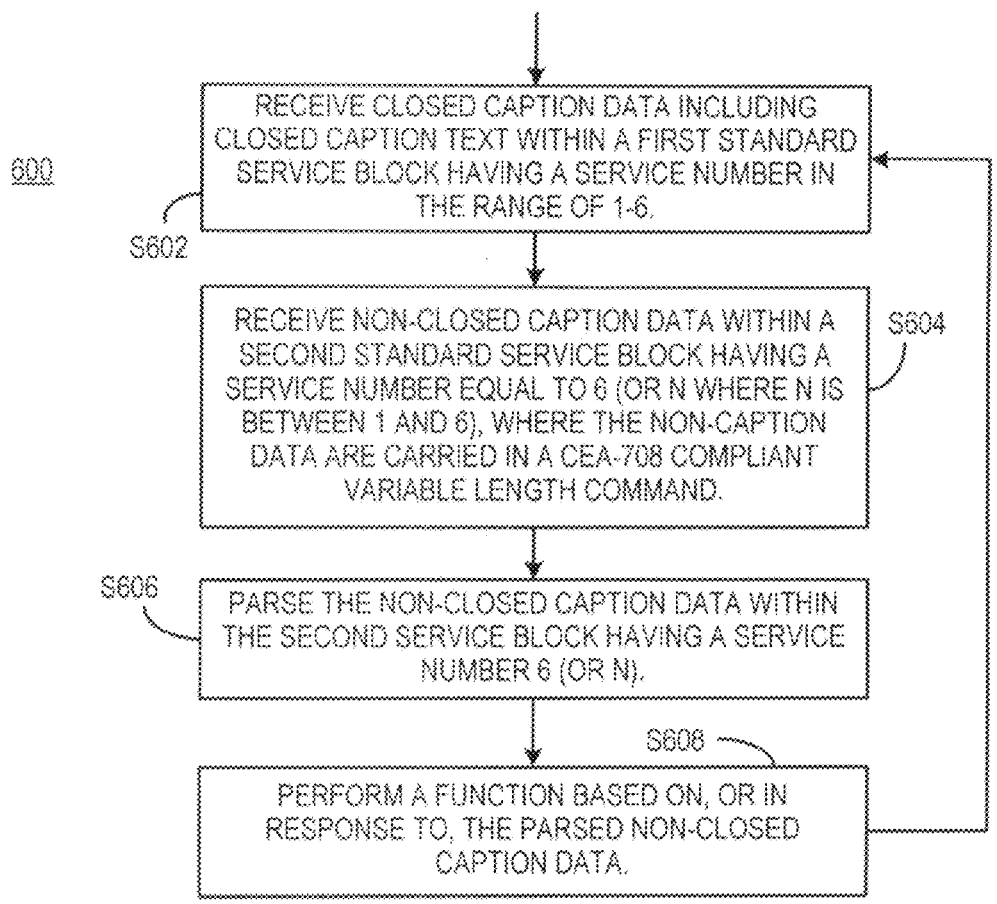
FIG. 6 is an example flow chart of a process consistent with certain embodiments of the present disclosure.

An exemplary method 600 of processing non-closed caption data is illustrated in FIG. 6. In one embodiment, the method is performed by the reception apparatus 20. The process begins at step S602 where closed caption data including closed caption text is received within a first Standard service block having a service number in the range of 1-6. At step S604, non-closed caption data is received within a second Standard service block having a service number equal to 6. In embodiments of the present disclosure, the Standard service used for the non-closed caption data could be any of service numbers n between 1 and 6, but since it is relatively rare for more than the first few of the service numbers to be used for caption data, service number 6 is preferred. Further, in one embodiment, the reception apparatus 20 receives closed caption service data that includes both the closed caption data and the non-closed caption data. For example, the closed caption service data may be provided to the reception apparatus in a closed caption transport stream.

At step S606, the reception apparatus 20 parses (e.g., in a parsing computer process module) the non-closed caption data from the second standard service block having the service number 6 (or n). The non-closed caption data is then processed at step S608 (e.g., in another processor operation) to perform a function based on, or in response to, the parsed non-closed caption data.

Figure 7:
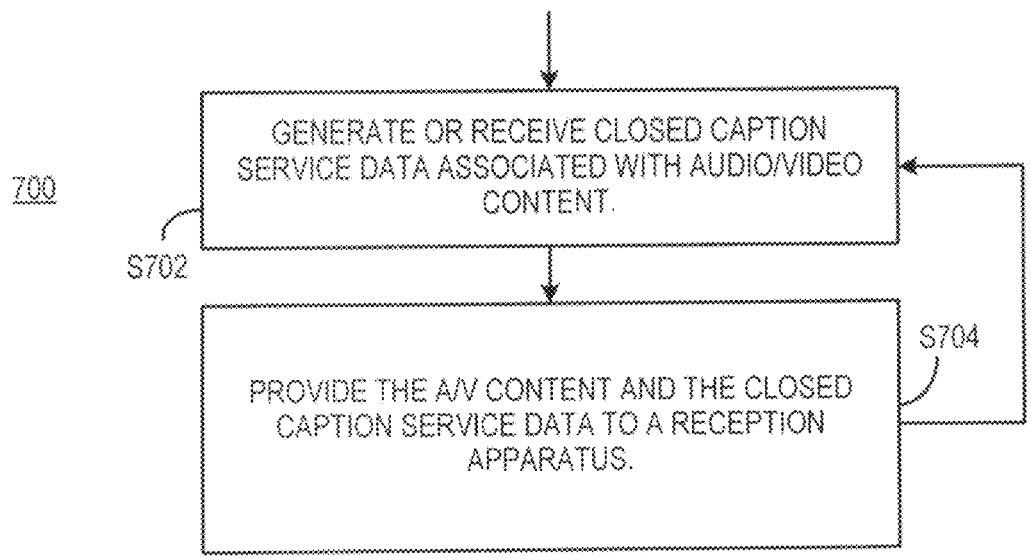
FIG. 7 is an example flow chart of a process consistent with certain embodiments of the present disclosure.
Figure 11:
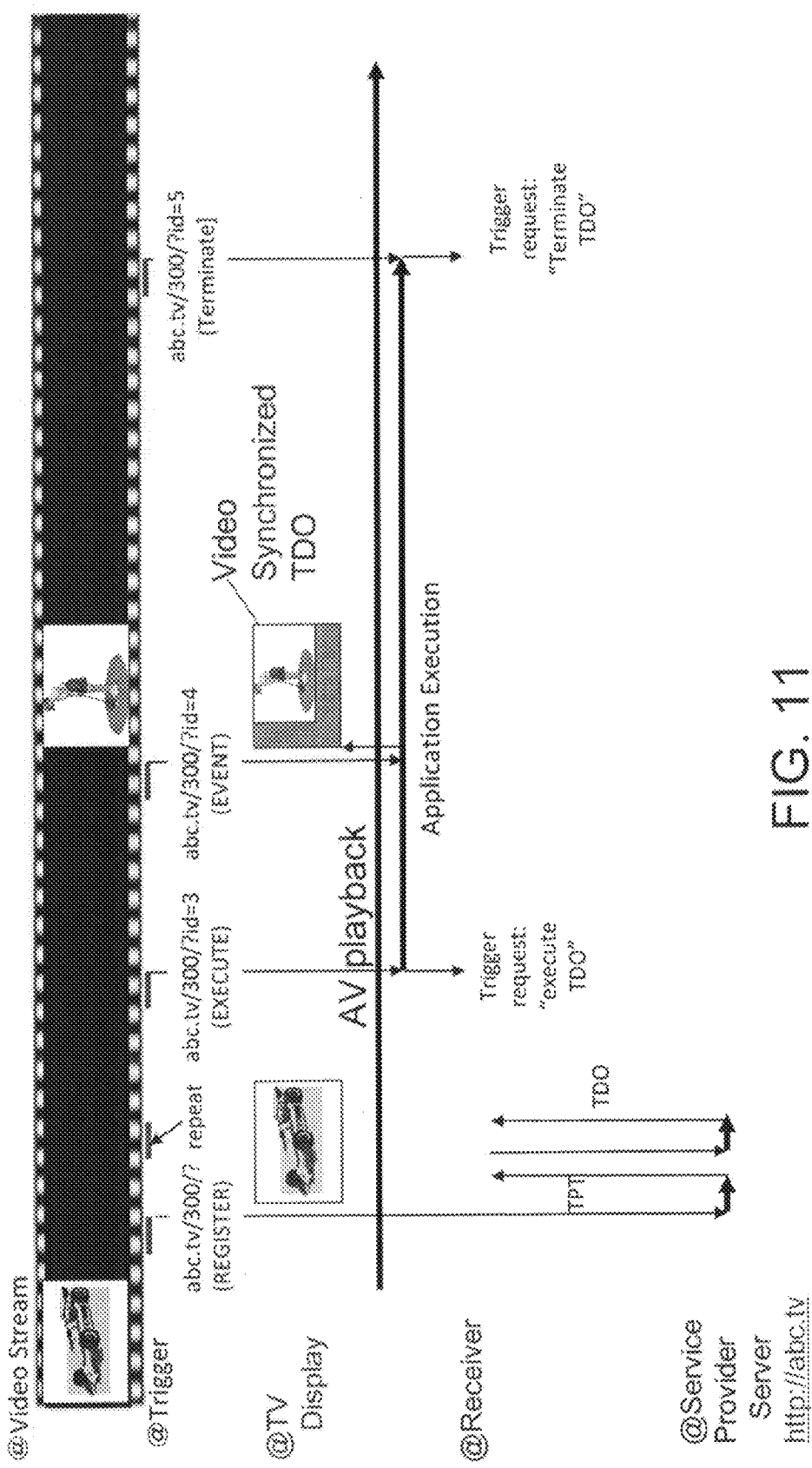
FIG. 11 illustrates exemplary usages of triggers associated with received content.
Figure 14A:
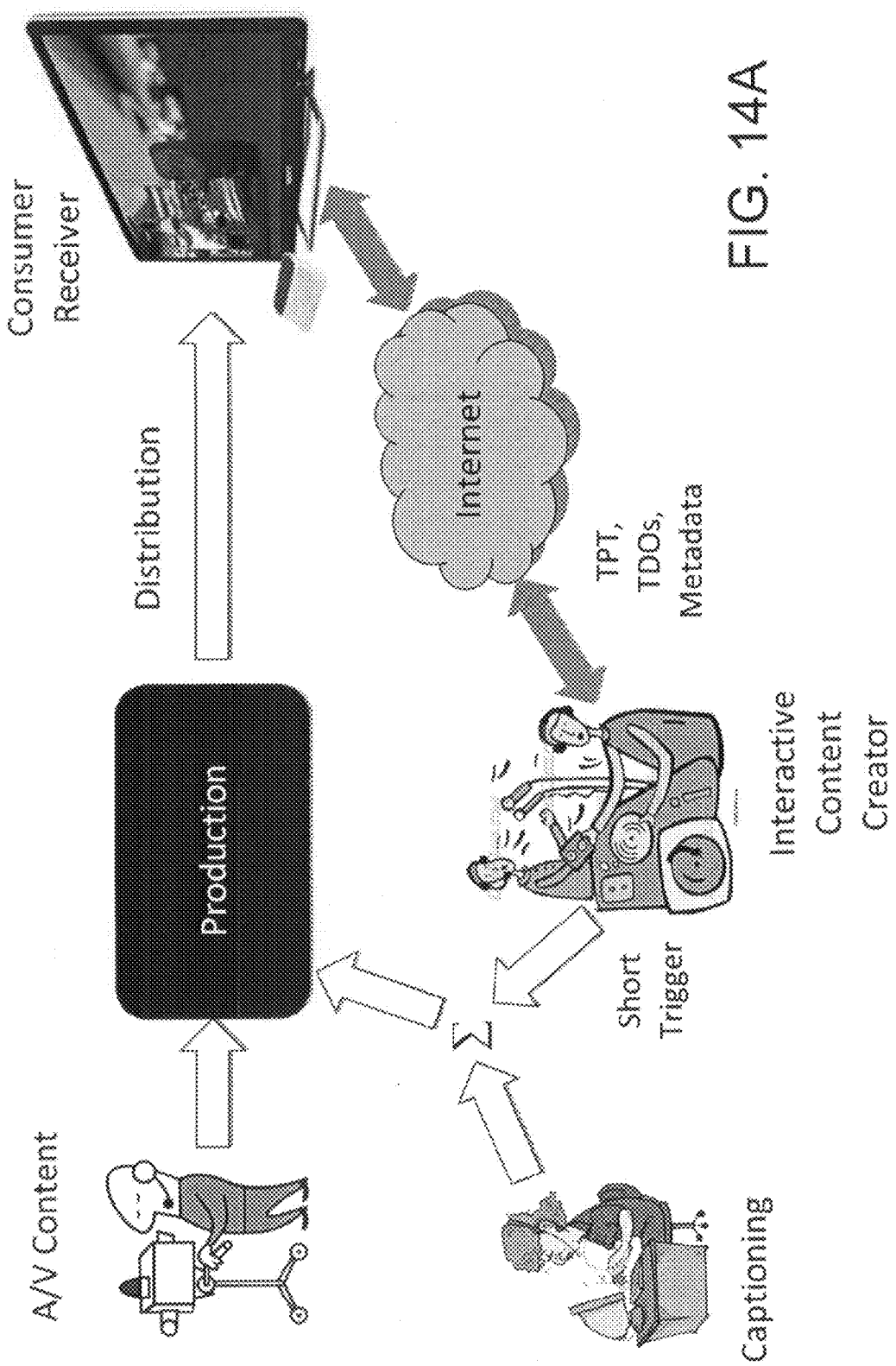
FIG. 14A illustrates an exemplary overview for generating closed caption service data.
Figure 14B:
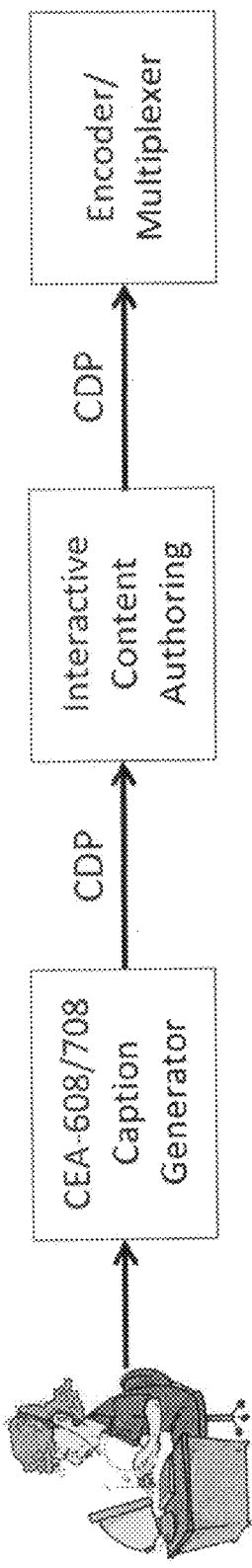
FIG. 14B illustrates an exemplary overview for generating closed caption data packets.

FIG. 7 illustrates an exemplary method 700 of providing non-closed caption data. In one embodiment, the method is performed by a content source 10 to provide the non-closed caption data to a reception apparatus 20. The process begins at step S702 at which time the content source 10 generates or receives closed caption service data associated with content to be provided to the reception apparatus 20. In step S704, the content source 10 provides the content (e.g., A/V content) and closed caption service data to the reception apparatus 20. The closed caption service data, in one embodiment, includes closed caption data and non-closed caption data. The closed caption data defines closed caption text associated with the content. Examples of sources of closed caption service data and the manner in which the closed caption service data is generated are illustrated in FIGS. 14A and 14B.

As described above, examples of non-closed caption data include trigger data (e.g., a short trigger), a data stream (e.g., including one or more parameters) suitable for ingestion and processing by one or more triggered declarative objects (TDOs), any other data related to one or more digital television services or interactive-television applications, etc. In the case of a short trigger, the size of the short trigger is for example less than 30 bytes. The short trigger, in one embodiment, functions to identify a location of a TPT server, indicate a current media time (i.e., where in play out we are), identify an event to execute now or later (e.g., in a TPT), and/or to smooth server peak load.

In one embodiment, the content of the short trigger includes a domain of the TPT server and one or more of a media time, trigger event ID, new time of specified TPT event, and diffusion timing information. An exemplary short trigger is "xbc.tv/7a1?mt=200909." The portion "xbc.tv" corresponds to the domain name registered to an entity that will provide additional data (e.g., interactive elements such as a TPT). The portion "/7a1" corresponds to the name/directory space managed by the registered owner of the domain. The combination "xbc.tv/7a1" identifies the server/directory where the additional data will be found. Further, the portion "?mt=200909" corresponds to a parameter portion, which may include for example a media time, an event, an event timing update, etc. FIGS. 12A-12C illustrate additional short trigger examples.

In one embodiment, by utilizing the caption data transport to transport non-closed caption data, a short trigger and trigger parameters table (TPT) approach can effectively add interactivity to linear TV and with the following advantages:

1. Short triggers can fit into small spaces, while longer ones may not fit.

2. The short trigger is human-readable text (URI+parameters), for easier creation/authoring, testing, and debugging.

3. The distribution chain is already set up for carriage of closed caption data. The trigger fits into the Society of Motion Picture and Television Engineers (SMPTE) caption data packet (CDP) that is defined as the interface between caption authoring stations and encoder/multiplexers. Thus, the amount of new or upgraded equipment that must be added in the broadcast station and distribution chain is minimized. There is already a distribution path for CDPs; no upgrades or new interfaces need to be defined for the encoders.

4. Interactivity can be added to a broadcast program simply by adding a short trigger to the caption stream, and placing the interactive content on an Internet server.

Further, in the decoder (e.g., the reception apparatus 20), the text (and/or non-closed caption data such as the short trigger) from caption service #6 can be easily captured.

As described above, in one embodiment, the non-closed caption data can be utilized in a "short trigger" scheme. The "short trigger" scheme involves universal resource identifier (URI)-based references to an entry in a TPT. An exemplary short trigger includes, or consists of, a registered Internet domain name, a "program ID" part, and an event ID. The event ID indexes an entry in the TPT. Thus, a given short trigger identifies (through the TPT) an interactive event as well as all the information that is associated with that event.

In one embodiment, the above-referenced non-closed caption data are carried in a CEA-708 compliant variable length command. In other embodiments, other multi-byte (i.e., not variable-length) commands can be used as well, for example in service number 6. It should be noted that any of the command codes that are not defined in CEA-708 (set aside for expansion) are usable in service number 6.

Embodiments described herein involve delivering non-closed caption data within a separate caption service that is known to be associated with one of the Standard caption services. However, in other embodiments, non-closed caption data is transported in a Standard service block having a service number in the range of 1-6 (e.g., service number 6), alongside actual closed caption data. The reception apparatus 20 distinguishes between the closed caption data and the non-closed caption data by means of command codes, as described below.

In accordance with this approach, Standard service #6 (or another Standard service number n=any of services 1 through 6) is defined as the Adjunct Data service. Characteristics of the Adjunct Data service include (1) Formatted as a Variable Length command (see CEA-708-D Section 7.1.11.2 Variable Length Codes from 0x90 to 0x9F) so that properly designed receivers will discard the contents of the packets; and (2) Not announced in the PSIP Caption Service Descriptor (thus properly designed receivers will not announce and offer the service containing Adjunct Data to the user).

FIG. 8 illustrates an embodiment in which the non-closed caption data includes a variable length ItvTrigger command 800. In one embodiment, the ItvTrigger is a short trigger with a format of
<domain_name>/<program_id>?id=<trigger_id>
(&tv=<trigger_validity>)

The "trigger validity" portion is optional. It is used to smooth out server loads in certain applications.

In some embodiments, it is necessary to deliver short triggers to the reception apparatus 20 to indicate (1) the location of the TPT server; and (2) the timing of interactive events, especially when the timing is not known beforehand (e.g. for live events).

Accordingly, as described above, certain embodiments of the present disclosure involve a method for delivery of the short trigger that utilizes the closed caption transport mechanism, specifically, delivery of triggers inside standard caption service #6.

In one embodiment, non-closed caption data (e.g., short triggers) are delivered using one of the unused code points, e.g., 0x98, to deliver a variable-length short trigger. As specified in CEA-708-D, Section 7.1.11.2, variable-length commands are indicated by the EXT1 character followed by a number in the range 0x90 to 0x9F, where the "0x" notation denotes a number represented in hexadecimal format. In the command format depicted in FIGS. 8 and 9, the EXT1 character (0x10) is followed by 0x98. In this context, 0x98 is the command identifier for an ItvTrigger command. However, any other unused command identifier can be associated with the ItvTrigger command. In accordance with the syntax defined in CEA-708-D Section 7.1.11.2, the next byte contains a two-bit Type field, a zero bit, followed by a 5-bit length field.

As noted above, in some embodiments, the EXT1+0x90-9F command sequence is used for the "variable-length" command. In other embodiments, other multi-byte (i.e., not variable-length) commands can be used as well, for example in service number 6. Any of the command codes that are not defined in CEA-708 (set aside for expansion) are usable in service number 6.

In one embodiment, the ItvTrigger( ) data structure follows the byte containing the length field. The syntax of one example of the trigger data is illustrated in FIG. 10 in pseudo code.

In the exemplary syntax of FIG. 10, trigger_type is a 4-bit unsigned integer that indicates the type of trigger to follow. In one embodiment, only type 0 triggers are defined. The value of trigger_type is set to 0. Receivers are expected to disregard instances of the ItvTrigger command indicating triggers of any other (unrecognized) type. Further, trigger_character is an 8-bit ASCII character whose value is restricted to those allowed for Uniform Resource Identifiers (URIs) by RFC 2396. The character string formed by trigger( ) is valid URI per RFC 2396, which is incorporated by reference in its entirety.

Use of a variable-length DTV closed caption command in Service #6 to transport non-closed caption data such as iTV triggers provides: (1) robust (explicit) signaling of the presence of an ITV trigger; (2) signaling of the type of trigger (for future expansion); (3) a transport format that is a natural extension to the existing CEA-708 DTVCC protocol; and (4) a transport method that is transparent to legacy receivers.

The present disclosure contains references to CEA-708 and CEA-708-D. Disclosures referring to CEA-708, without the revision letter, relate to the CEA-708 standard generally and not to details that are included, or not included, by a particular revision of the standard. Further, disclosures referring to a particular version of the CEA-708 standard (e.g., CEA-708-D) are expected to apply to other revisions (e.g., successor revisions) of the standard.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as non-transitory storage devices including as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. The term non-transitory does not suggest that information cannot be lost by virtue of removal of power or other actions. Such alternative storage devices should be considered equivalents.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in operational flow, user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

The invention claimed is:

1. A reception apparatus, comprising:
circuitry configured to
receive closed caption service data, the closed caption service data including closed caption data within a first service block having a service number in the range of 1-6, and non-closed caption data within a second service block having a different service number in the range of 1-6, the closed caption data including closed caption text;
parse the non-closed caption data within the second service block having the different service number in the range of 1-6;
process the non-closed caption data within the second service block irrespective of whether closed caption text from any service block included in the closed caption service data is to be processed for presentation to a user; and
perform a function based on the processed non-closed caption data.

2. The reception apparatus according to claim 1, wherein the non-closed caption data defines a trigger that identifies a location of a trigger parameters table (TPT), the TPT including metadata regarding a triggered declarative object (TDO) and at least one event associated with the TDO.

3. The reception apparatus according to claim 1, wherein the non-closed caption data defines a trigger including information on a trigger type and a uniform resource identifier.

4. The reception apparatus according to claim 1, wherein the non-closed caption data defines one or more parameters to be processed by a triggered declarative object (TDO).

5. The reception apparatus according to claim 1, wherein the non-closed caption data is carried in a CEA-708 compliant variable length command.

6. The reception apparatus according to claim 5, wherein the non-closed caption data is carried in the CEA-708 compliant variable length command having a variable length command of 0x98.

7. The reception apparatus according to claim 1, wherein the different service number of the second service block is service number 6.

8. The reception apparatus according to claim 1, wherein the circuitry is configured to receive audio/video (A/V) content associated with the closed caption service data, and
the non-closed caption data defines a trigger that identifies a location of data associated with the A/V content.

9. A method of a reception apparatus for processing non-closed caption data, the method comprising:
receiving, by circuitry of the reception apparatus, closed caption service data, the closed caption service data including closed caption data within a first service block having a service number in the range of 1-6, and non-closed caption data within a second service block having a different service number in the range of 1-6, the closed caption data including closed caption text;
parsing the non-closed caption data within the second service block having the different service number in the range of 1-6;
processing, by the circuitry, the non-closed caption data within the second service block irrespective of whether closed caption text from any service block included in the closed caption service data is to be processed for presentation to a user; and
performing, by the circuitry, a function based on the processed non-closed caption data.

10. The method according to claim 9, wherein the non-closed caption data defines a trigger that identifies a location of a trigger parameters table (TPT), the TPT including metadata regarding a triggered declarative object (TDO) and at least one event associated with the TDO.

11. The method according to claim 9, wherein the non-closed caption data defines a trigger including information on a trigger type and a uniform resource identifier.

12. The method according to claim 9, wherein the non-closed caption data defines one or more parameters to be processed by a triggered declarative object (TDO).

13. The method according to claim 9, wherein the non-closed caption data is carried in a CEA-708 compliant variable length command.

14. The method according to claim 13, wherein the non-closed caption data is carried in the CEA-708 compliant variable length command having a variable length command of 0x98.

15. The method according to claim 9, wherein the different service number of the second service block is service number 6.

16. The method according to claim 9, further comprising:
receiving audio/video (A/V) content associated with the closed caption service data, wherein
the non-closed caption data defines a trigger that identifies a location of data associated with the A/V content.

17. A non-transitory computer-readable storage medium storing instructions which when executed by a computer causes the computer to perform a method of a reception apparatus for processing non-closed caption data, the method comprising:
receiving, by the reception apparatus, closed caption service data, the closed caption service data including closed caption data within a first service block having a service number in the range of 1-6, and non-closed caption data within a second service block having a different service number in the range of 1-6, the closed caption data including closed caption text;
parsing the non-closed caption data within the second service block having the different service number in the range of 1-6;
processing, by the reception apparatus, the non-closed caption data within the second service block irrespective of whether closed caption text from any service block included in the closed caption service data is to be processed for presentation to a user; and
performing a function based on the parsed non-closed caption data.

18. An information providing apparatus, comprising:
circuitry configured to
generate or receive closed caption service data associated with audio/video (A/V) content; and provide to a reception apparatus the A/V content and the closed caption service data, the closed caption service data including closed caption data within a first service block having a service number in the range of 1-6, and non-closed caption data within a second service block having a different service number in the range of 1-6, the closed caption data including closed caption text, wherein the reception apparatus is configured to process the non-closed caption data within the second service block irrespective of whether closed caption text from any service block included in the closed caption service data is to be processed for presentation to a user.

19. A method of an information providing apparatus for providing non-closed caption data, the method comprising:

generating or receiving, by circuitry of the information providing apparatus, closed caption service data associated with audio/video (A/V) content; and providing, by the circuitry, to a reception apparatus the A/V content and the closed caption service data, the closed caption service data including closed caption data within a first service block having a service number in the range of 1-6, and non-closed caption data within a second service block having a different service number in the range of 1-6, the closed caption data including closed caption text, wherein the reception apparatus is configured to process the non-closed caption data within the second service block irrespective of whether closed caption text from any service block included in the closed caption service data is to be processed for presentation to a user.

20. A non-transitory computer-readable storage medium storing instructions which when executed by a computer causes the computer to perform a method of an information providing apparatus for providing non-closed caption data, the method comprising:

generating or receiving, by the information providing apparatus, closed caption service data associated with audio/video (A/V) content; and providing, by the information providing apparatus, to a reception apparatus the A/V content and the closed caption service data, the closed caption service data including closed caption data within a first service block having a service number in the range of 1-6, and non-closed caption data within a second service block having a different service number in the range of 1-6, the closed caption data including closed caption text, wherein the reception apparatus is configured to process the non-closed caption data within the second service block irrespective of whether closed caption text from any service block included in the closed caption service data is to be processed for presentation to a user.

* * * * *